United States Patent
Seong

(10) Patent No.: US 9,818,991 B2
(45) Date of Patent: Nov. 14, 2017

(54) SECONDARY BATTERY

(71) Applicant: Samsung SDI Co., Ltd., Yongin-si, Gyeonggi-do (KR)

(72) Inventor: Jaeil Seong, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 41 days.

(21) Appl. No.: 14/965,652

(22) Filed: Dec. 10, 2015

(65) Prior Publication Data
US 2016/0172639 A1 Jun. 16, 2016

(30) Foreign Application Priority Data

Dec. 11, 2014 (KR) .................. 10-2014-0178369

(51) Int. Cl.
*H01M 2/04* (2006.01)
*H01M 2/02* (2006.01)
*H01M 10/0525* (2010.01)

(52) U.S. Cl.
CPC ....... *H01M 2/0456* (2013.01); *H01M 2/0217* (2013.01); *H01M 10/0525* (2013.01)

(58) Field of Classification Search
None
See application file for complete search history.

(56) References Cited

U.S. PATENT DOCUMENTS

2011/0064996 A1 3/2011 Park
2012/0058389 A1 3/2012 Guen
2012/0156548 A1 6/2012 Kim

FOREIGN PATENT DOCUMENTS

| KR | 2010-0082200 A | 7/2010 |
| KR | 2011-0029309 A | 3/2011 |
| KR | 2012-0025854 A | 3/2012 |
| KR | 2012-0073748 A | 7/2012 |

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

Provided is a secondary battery, which can improve a coupling force between a case and a cap plate and can improve stability of the secondary battery, by forming a coupling protrusion on a side surface of the cap plate and forming a coupling groove corresponding to the coupling protrusion on an inner surface of the case. The secondary battery includes an electrode assembly, a case accommodating the electrode assembly, and a cap plate coupled to an opening of the case. A coupling protrusion protruding toward an inner surface of the case is formed on a side surface of the cap plate, and a coupling groove corresponding to the coupling protrusion is formed on the inner surface of the case.

20 Claims, 7 Drawing Sheets

SECONDARY BATTERY

RELATED APPLICATIONS

This application claims priority to and the benefit of Korean Patent Application No. 10-2014-0178369, filed on Dec. 11, 2014 in the Korean Intellectual Property Office, the content of which is herein incorporated by reference in its entirety.

BACKGROUND

Field

The present invention relates to a secondary battery.

Description of the Related Art

Unlike a primary battery which cannot be recharged, a secondary battery can be repeatedly charged and discharged. Low capacity batteries that use single battery cells are used as power sources for various portable small-sized electronic devices such as cellular phones, and camcorders. High power batteries that use tens of battery cells connected to each other in a battery pack are used as power sources for hybrid vehicles or electric vehicles.

Secondary batteries may be classified into different types such as cylindrical and prismatic batteries. The secondary battery is generally configured by accommodating an electrode assembly having a positive electrode plate and a negative electrode plate and a separator as an insulator located therebetween in a case with an electrolyte and installing a cap plate in the case. Here, positive and negative electrode terminals are connected to the electrode assembly and are exposed and protruded to the outside through the cap plate.

SUMMARY OF CERTAIN INVENTIVE ASPECTS

The present invention provides a secondary battery, which can improve a coupling force between a case and a cap plate and can improve stability of the secondary battery, by forming a coupling protrusion on a side surface of the cap plate and forming a coupling groove corresponding to the coupling protrusion on an inner surface of the case.

The above and other objects of the present invention will be described in or be apparent from the following description of the preferred embodiments.

According to an aspect of the present invention, there is provided a secondary battery including an electrode assembly, a case accommodating the electrode assembly, and a cap plate coupled to an opening of the case, wherein a coupling protrusion protruding toward an inner surface of the case is formed on a side surface of the cap plate, and a coupling groove corresponding to the coupling protrusion is formed on the inner surface of the case.

At least two coupling protrusions may be formed to be symmetrical with each other.

The cap plate may have two pairs of side surfaces facing each other, and each one of the coupling protrusions may be provided on one selected from the two pairs of side surfaces.

The cap plate may have two pairs of side surfaces facing each other, and each one of the coupling protrusion may be provided on each one of the two pairs of side surfaces.

The cap plate may have two pairs of side surfaces facing each other, and each one of the coupling protrusion may be provided on each of corners at which the two pairs of side surfaces are connected to each other.

The cap plate may have a top surface, a bottom surface facing the top surface, and side surfaces connecting the top surface and the bottom surface to each other, the coupling protrusion may be formed on the side surface of the cap plate, and an inclined surface may be formed on a region extending from a lower portion of the coupling protrusion to a bottom surface of the cap plate.

The coupling groove may be a groove which is recessed to a predetermined depth from the inner surface of the case to an outer surface of the case.

A protrusion, which protrudes as much as the depth of the coupling groove, may be formed on a region of the outer surface of the case, the region corresponding to the coupling groove.

The case may include first and second grooves which are spaced apart from each other and are recessed a predetermined depth from the outer surface of the case to the inner surface of the case, and first and second protrusions protruding on regions corresponding to the first and second grooves as much as the depth of each of the first and second grooves, and a coupling groove may be formed between the first and second protrusions.

An inclined surface may be formed on an upper region, corresponding to the coupling groove inside the opening of the case.

In the secondary battery according to the present invention, a coupling force between a case and a cap plate can be improved and stability of the secondary battery can be improved by forming a coupling protrusion on a side surface of the cap plate and forming a coupling groove on an inner surface of the case corresponding to the coupling protrusion.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF CERTAIN INVENTIVE EMBODIMENTS

Figure 1:
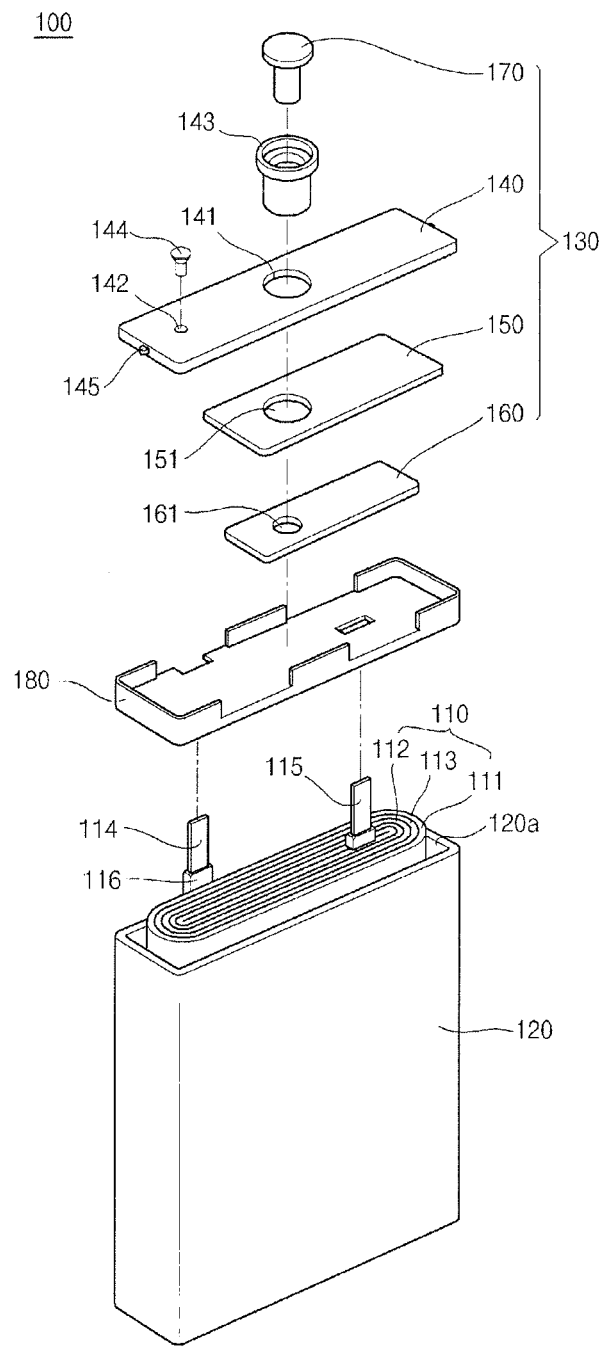
FIG. 1 is an exploded perspective view of a secondary battery according to an embodiment of the present invention.

Some example embodiments of the present invention will be described more fully hereinafter with reference to the accompanying drawings; however, the present invention may be embodied in many different forms and should not be construed as being limited to the embodiments set forth herein. Rather, these embodiments are provided so that this disclosure will be thorough and complete and will fully convey the concept of the invention to those skilled in the art.

In the drawings, the thickness of layers and regions are exaggerated for clarity. Like numbers refer to like elements throughout. As used herein, the term "and/or" includes any and all combinations of one or more of the associated listed items. The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another member, element, region, layer and/or section. Thus, for example, a first member, element, region, layer and/or section discussed below could be termed a second member, element, region, layer and/or section without departing from the teachings of the present invention.

Figure 2:
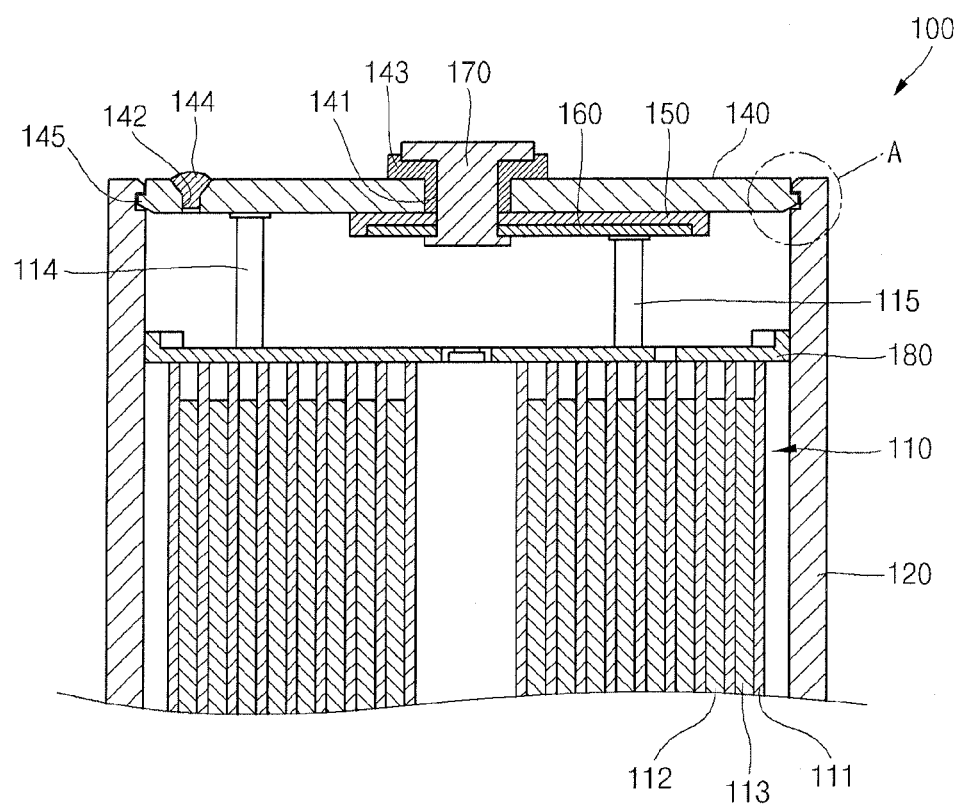
FIG. 2 is a cross-sectional view of the secondary battery shown in FIG. 1.
Figure 3A:
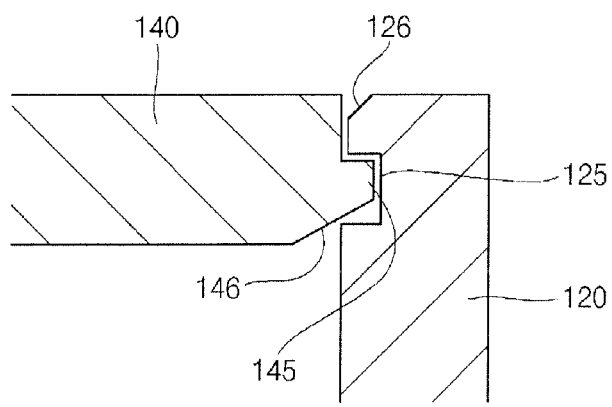
FIG. 3A and FIG. 3B are enlarged views illustrating an 'A' portion of FIG. 2 according to various embodiments of the present invention.
Figure 3B:
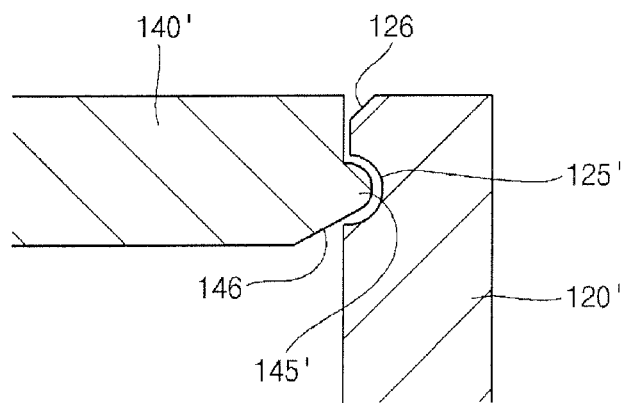

FIG. 1 is an exploded perspective view of a secondary battery according to an embodiment of the present invention, FIG. 2 is a cross-sectional view of the secondary battery shown in FIG. 1, and FIG. 3A and FIG. 3B are enlarged views illustrating an 'A' portion of FIG. 2 according to various embodiments of the present invention.

Referring to FIGS. 1 to 3B, the secondary battery 100 according to an embodiment of the present invention may include an electrode assembly 110, a case 120, a cap assembly 130 and an insulation case 180.

The electrode assembly 110 includes a positive electrode plate 111, a negative electrode plate 112, and a separator 113 interposed between the positive electrode plate 111 and the negative electrode plate 112. In addition, the electrode assembly 110 may be formed by winding the positive electrode plate 111, the negative electrode plate 112 and the separator 113 in a substantially jelly-roll shaped configuration.

In more detail, the electrode assembly 110 may include a positive electrode plate 111 having a positive electrode active material coated thereon, a negative electrode plate 112 having a negative electrode active material coated thereon, and a separator 113 positioned between the positive electrode plate 111 and the negative electrode plate 112 to prevent a short-circuit and to allow only movement of lithium ions. The positive electrode plate 111 may be made of an aluminum (Al) foil, the negative electrode lead 112 may be made of copper (Cu) foil, and the separator 113 may be made of polyethylene (PE) or polypropylene (PP), but aspects of the present invention are not limited to the above materials. In addition, a first electrode tab 114 upwardly protruding a predetermined length may be connected to the positive electrode plate 111, and a second electrode tab 115 upwardly protruding a predetermined length may be connected to the negative electrode plate 112. The first electrode tab 114 may be made of aluminum (Al), and the second electrode tab 115 may be made of nickel (Ni), but aspects of the present invention are not limited thereto. In addition, polarities of the first electrode tab 114 and the second electrode tab 115 may be optionally changed by one skilled in the art.

The case 120 has a top opening 12a having an opened top portion and may be formed to have a substantially hexahedral shape. That is to say, the case 120 includes a pair of long side portions spaced a predetermined distance apart from each other and having relatively wide areas, a pair of short side portions having relatively narrow areas, and a bottom portion formed perpendicular to the long and short side portions.

The case 120 may be manufactured by a deep drawing method and the long and short side portions and the bottom portion are integrally formed with one another. In the present embodiment, the case 120 may be made of steel, aluminum, an equivalent thereof, but the present invention does not limit the material of the case 120 to the above materials.

An electrolyte (not shown) is received in the case 120 together with the electrode assembly 110. The electrolyte may function as a movement medium of lithium ions generated by an electrochemical reaction between the positive electrode plate 111 and the negative electrode plate 112 in the secondary battery 100 during charging or discharging. The electrolyte may be a nonaqueous organic electrolyte including a lithium salt and a high-purity organic solvent. In addition, the electrolyte may be a polymeric electrolyte.

A coupling groove 125 that is recessed a predetermined depth is formed at a region adjacent to the top opening 12a of the long side portion or the short side portion of the case 120. The coupling groove 125 is engaged with a coupling protrusion 145 of the cap plate 140, which will later be described. That is to say, the cap plate 140 may be tightly fixed by the coupling groove 125. Therefore, a coupling force between the case 120 and the cap plate 140 may be improved, and even if a shock is applied to the secondary battery 100, movement of the cap plate 140 is prevented, thereby preventing or inhibiting the secondary battery 100 from leaking and being deformed. In addition, an inclined portion 126 is formed at an upper region corresponding to the coupling groove 125 in the top opening 12a of the case 120. Here, the inclined portion 126 is formed to be spaced apart from the coupling groove 125. The inclined portion 126 allows the coupling protrusion 145 to be more easily engaged with the coupling groove 125 through the top opening 12a of the case 120.

The cap assembly 130 includes a cap plate 140, an insulation plate 150, a terminal plate 160 and an electrode terminal 170. The cap assembly 130 is combined with a separate insulation case 180 to be coupled with the top opening 12a of the case 120 and may seal the case 120.

The cap plate 140 may be formed of a metal plate sized and shaped to correspond to the top opening 12a of the case 120. The first electrode tab 114 of the electrode assembly 110, passing through the insulation case 180, may be welded to a bottom surface of the cap plate 140. That is to say, the cap plate 140 may have the same polarity with the first electrode tab 114 of the electrode assembly 110.

A terminal throughhole 141 passing through a portion between the top and bottom surfaces of the cap plate 140 is formed at the center of the cap plate 140, and the electrode terminal 170 is inserted into the terminal throughhole 141 to then be coupled. In order to insulate the electrode terminal 170 and the cap plate 140 from each other, a tubular gasket 143 is mounted on an inner surface of the terminal throughhole 141. The gasket 143 is tightly installed between the terminal throughhole 141 and the electrode terminal 170 and electrically separates the electrode terminal 170 and the cap plate 140 from each other. That is to say, the terminal throughhole 141 of the cap plate 140 may be sized to correspond to an outer diameter of the gasket 143.

An electrolyte injection hole 142 for injecting an electrolyte into an inner space of the case 120 after being assembled with the top opening 12a of the case 120 may further be provided at one side of the cap plate 140. In addition, the electrolyte injection hole 142 may be sealed by a plug 144 after the electrolyte is injected into the case 120.

A coupling protrusion 145 protruding to make contact with an inner surface of the case 120 is formed on a side surface of the cap plate 140. At least two coupling protrusions 145 may be formed to be symmetrical with each other. When being combined with the case 120, the coupling protrusion 145 is engaged with the coupling groove 125 located on the inner surface of the case 120 to correspond to the coupling protrusion 145.

In particular, referring to FIG. 3A, the coupling protrusion 145 is formed to be spaced apart from the top and bottom surfaces of the cap plate 140. In addition, an inclined surface 146 is formed on a region extending from a lower portion of the coupling protrusion 145 to the bottom surface of the cap plate 140. Therefore, the coupling protrusion 145 of the cap plate 140 is more easily inserted into the case 120 by the inclined surface 146 and the inclined portion 126 to then be placed in the coupling groove 125. After the coupling protrusion 145 and the coupling groove 125 are engaged with each other, exposed boundary regions of the cap plate 140 and the case 120 are welded and coupled to each other. For example, a laser beam is applied to the upwardly exposed boundary regions of the cap plate 140 and the case 120, thereby melting and cooling the boundary regions to then be welded to each other.

Meanwhile, referring to FIG. 3A, the coupling protrusion 145 and the coupling groove 125 have planar surfaces. But, aspects of the present invention are not limited thereto. In some case, referring to FIG. 3B, a coupling protrusion 145' of a cap plate 140' and a coupling groove 125' of a case 120' may be formed to have rounded surfaces.

The insulation plate 150 is made of an insulating material and is interposed between the cap plate 140 and the terminal plate 160 to electrically insulate the cap plate 140 and the terminal plate 160 from each other. The insulation plate 150 has a terminal throughhole 151 located to correspond to the terminal throughhole 141 of the cap plate 140 to allow the electrode terminal 170 to be inserted thereinto. The electrode terminal 170 is inserted into the terminal throughhole 151 of the insulation plate 150 to then be combined with the insulation plate 150. That is to say, the terminal throughhole 151 of the insulation plate 150 may be sized to correspond to an outer diameter of the electrode terminal 170.

The terminal plate 160 may be formed of a metal plate having a top surface 16a closely adhered to a bottom surface of the insulation plate 150. A bottom surface 160b of the terminal plate 160 faces a top surface of the insulation case 180. That is to say, the terminal plate 160 is interposed between the insulation plate 150 and the insulation case 180. The top surface 16a of the terminal plate 160 preferably has a smaller size than the bottom surface of the insulation plate 150. The terminal plate 160 is electrically insulated from the cap plate 140 by the insulation plate 150. The bottom surface 16b of the terminal plate 160 may be welded to the second electrode tab 115 of the electrode assembly 110, which has passed through the insulation case 180, to have the same polarity.

The terminal plate 160 includes a terminal throughhole 161 located to correspond to the terminal throughhole 141 of the cap plate 140 to allow the electrode terminal 170 to be inserted thereinto. The electrode terminal 170 is inserted into the terminal throughhole 161 of the terminal plate 160 to then be coupled thereto. That is to say, the terminal throughhole 161 of the terminal plate 160 may be sized to correspond to the outer diameter of the electrode terminal 170.

The electrode terminal 170 is inserted to pass through terminal throughholes 141, 151 and 161 of the cap plate 140, the insulation plate 150 and the terminal plate 160. The electrode terminal 170 may be formed of a cylindrical metal pin. The electrode terminal 170 is electrically connected to the second electrode tab 115 of the electrode assembly 110 through the terminal plate 160. When the electrode terminal 170 is inserted into the terminal throughhole 141 of the cap plate 140, it is electrically insulated from the cap plate 140 by the gasket 143. Meanwhile, the first electrode tab 114 may be connected to the electrode terminal 170 by a forming method of the electrode assembly 110. The electrode terminal 170 is generally formed as a negative electrode terminal. However, the electrode terminal 170 may be conversely formed as a positive electrode terminal according to the configuration of a secondary battery.

The insulation case 180 is made of an insulating material and is interposed between the cap assembly 130 and the electrode assembly 110 to electrically insulate the cap assembly 130 and the electrode assembly 110 from each other. In addition, the insulation case 180 includes a tab hole for allowing the first electrode tab 114 and the second electrode tab 115 of the cap assembly 130 to upwardly protrude. That is to say, the insulation case 180 electrically insulates a top portion of the electrode assembly 110, from which the first electrode tab 114 and the second electrode tab 115 of the electrode assembly 110 are drawn, from the cap assembly 130.

As described above, in the secondary battery 100 according to an embodiment of the present invention, at least two coupling protrusions 145 are symmetrically formed on the side surface of the cap plate 141 to be with each other and the coupling groove 125 is formed on the inner surface of the case 120 corresponding to the coupling protrusion 145. Since the coupling protrusion 145 is mounted in the coupling groove 125, the cap plate 141 and the case 120 are tightly coupled to each other. Therefore, even if a shock is applied to the secondary battery 100, movement of the cap plate 141 is inhibited so as not to be separated from the case 120, thereby preventing or inhibiting the secondary battery 100 from being leaked and being deformed. Meanwhile, the coupling protrusion 145 includes the inclined surface 146 formed at its lower portion, and the inclined portion 126 is formed at an upper region of the coupling groove 125 in the top opening 12a of the case 120. Therefore, the inclined surface 146 of the coupling protrusion 145 moves along the inclined portion 126 of the case 120, so that the coupling protrusion 145 is more easily placed into the coupling groove 125.

FIGS. 4A to 4D are plan views of cap plates according to various embodiments of the present invention. The same functional component as that of the previous embodiment is denoted by the same reference numeral and the following description will focus on differences between the present and previous embodiments.

Figure 4A:
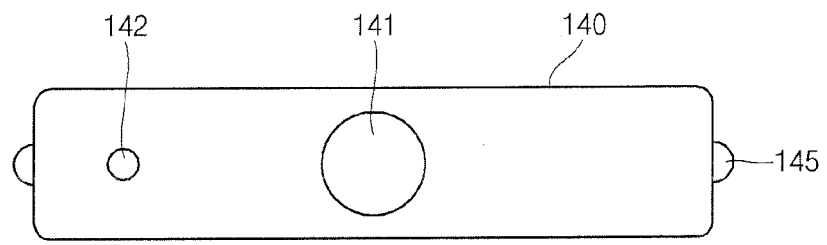
FIGS. 4A to 4D are plan views of cap plates according to various embodiments of the present invention.

FIG. 4A is a plan view of the cap plate 140 shown in FIGS. 1 to 3A. Referring to FIG. 4A, the cap plate 140 includes a coupling protrusion 145 formed on each of a pair of short side surfaces corresponding to a pair of short side portions of the case (120 of FIGS. 1 to 3). As shown in FIG. 4A, the coupling protrusion 145 is hemi-spherically shaped, but aspects of the present invention are not limited thereto. In order to increase a coupling force between the coupling protrusion 145 and the case, the coupling protrusion 145 is preferably formed at a center of the pair of short side surfaces. Here, it is quite reasonable to form a coupling groove 125 corresponding to the coupling protrusion 145 inside the case.

Figure 4B:
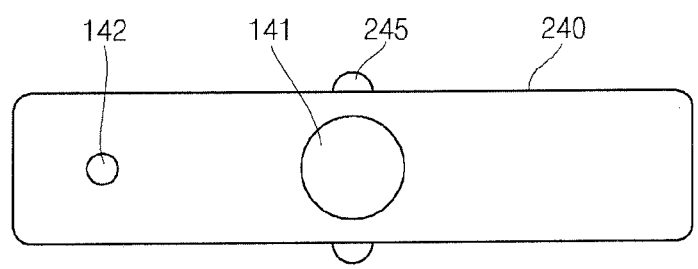

FIG. 4B is a plan view of a cap plate 240 according to another embodiment of the present invention. Referring to FIG. 4B, the cap plate 240 includes a coupling protrusion 245 formed on each of a pair of long side surfaces corresponding to a pair of long side portions of the case (120 of FIGS. 1 to 3). As shown in FIG. 4B, the coupling protrusion 245 is hemi-spherically shaped, but aspects of the present invention are not limited thereto. In order to increase a coupling force between the coupling protrusion 245 and the case, the coupling protrusion 245 is preferably formed at a center of the pair of long side surfaces. Here, it is quite reasonable to form a coupling groove 225 corresponding to the coupling protrusion 245 inside the case.

Figure 4C:
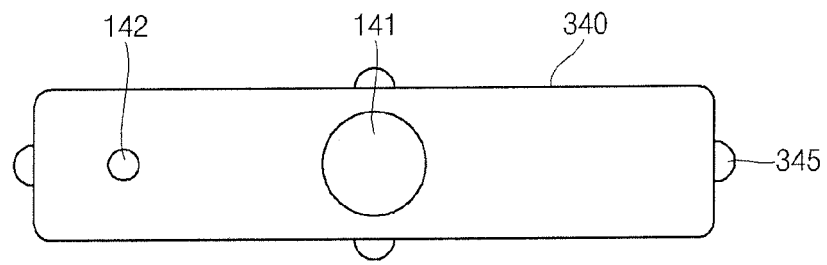

FIG. 4C is a plan view of a cap plate 340 according to still another embodiment of the present invention. Referring to FIG. 4C, the cap plate 340 includes coupling protrusions 345 each formed on each one of a pair of short side surfaces and a pair of long side surfaces corresponding to the pair of short side portions and the pair of long side portions of the case (120 of FIGS. 1 to 3).

That is to say, each one coupling protrusion 345 is provided on each of all side surfaces of the cap plate 340. As shown in FIG. 4C, the coupling protrusions 345 are hemi-spherically shaped, but aspects of the present invention are not limited thereto. In order to increase a coupling force between the coupling protrusion 345 and the case, the coupling protrusions 345 are preferably formed at a center of the pair of short side surfaces and at a center of the pair of long side surfaces. Here, it is quite reasonable to form coupling grooves corresponding to the coupling protrusions 345 inside the case.

Figure 4D:
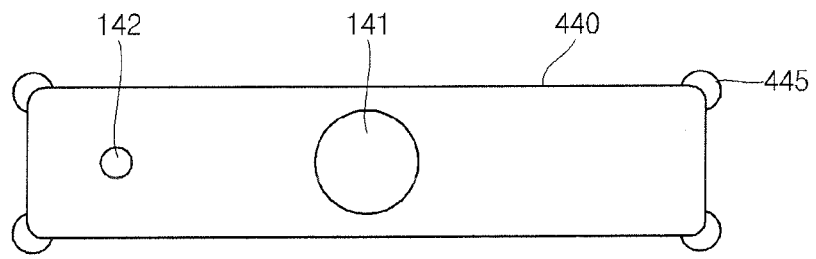

FIG. 4D is a plan view of a cap plate 440 according to still another embodiment of the present invention. Referring to FIG. 4D, the cap plate 440 includes coupling protrusions 445 formed at corners at which one of a pair short side surfaces is connected to one of a pair of long side surfaces and the other of the pair short side surfaces is connected to the other of the pair of long side surfaces. As shown in FIG. 4D, the coupling protrusions 445 are substantially circular shaped, but aspects of the present invention are not limited thereto. In addition, it is quite reasonable to form coupling grooves corresponding to the coupling protrusions 445 inside the case.

Figure 5A:
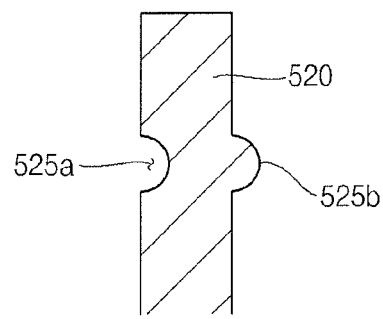
FIGS. 5A and 5B are partially cross-sectional views illustrating cases according to various embodiments of the present invention.
Figure 5B:
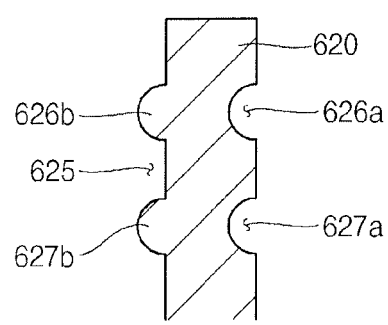

FIGS. 5A and 5B are partially cross-sectional views illustrating cases according to various embodiments of the present invention.

In FIGS. 5A and 5B, the left side on each drawing may correspond to the interior side of a case and the right side on each drawing may correspond to the exterior side of the case. The same components as those of the previous embodiments are not illustrated herein and the following description will focus on only differences between the present and previous embodiments.

FIG. 5A is a partially cross-sectional view illustrating a case (520) according to still another embodiment of the present invention. Referring to FIG. 5A, the case 520 includes a coupling groove 525a which is recessed to a predetermined depth from an inner surface of the case 520. In addition, a protrusion 525b protruding a predetermined length from an outer surface of the case 520 is formed at an exterior side corresponding to the coupling groove 525a of the case 520.

Here, the depth of the coupling groove 525a and the length of the protrusion 525b are substantially equal to each other. That is to say, the coupling groove 525a of the case 520 may be formed by pressing using a jig. As shown in FIG. 5A, the coupling groove 525a and the protrusion 525b are hemi-spherically shaped, but aspects of the present invention are not limited thereto. In addition, although not shown, like in the embodiment shown in FIGS. 1 to 3B, an inclined portion may be formed on the coupling groove 525a. Further, it is quite reasonable that a coupling protrusion corresponding to the coupling groove 525a should be formed on a side surface of a cap plate to then be engaged with each other.

FIG. 5B is a partially cross-sectional view illustrating a case (620) according to still another embodiment of the present invention. Referring to FIG. 6B, the case 620 includes first and second grooves 626a and 627a which are recessed a predetermined depth from an outer surface of the case 620. In addition, the case 620 includes first and second protrusions 626b and 627b which protrude a predetermined length from an inner surface of the case 620, corresponding to the first and second grooves 626a and 627a. Here, the depths of the first and second grooves 626a and 627a and the lengths of the first and second protrusions 626b and 627b are substantially equal to each other. That is to say, the first and second grooves 626a and 627a and the first and second protrusions 626b and 627b of the case 620 may be formed by pressing using a jig. As shown in FIG. 5B, the first and second grooves 626a and 627a and the first and second protrusions 626b and 627b are hemi-spherically shaped, but aspects of the present invention are not limited thereto.

Meanwhile, the first and second grooves 626a and 627a are spaced apart from each other, and the first and second protrusions 626b and 627b are also spaced apart from each other. In addition, a coupling groove 625 is formed between the first and second protrusions 626b and 627b. A coupling protrusion corresponding to the coupling groove 625 is formed on a side surface of a cap plate, so that the coupling groove 625 and the coupling protrusion are engaged with each other.

Figure 6:
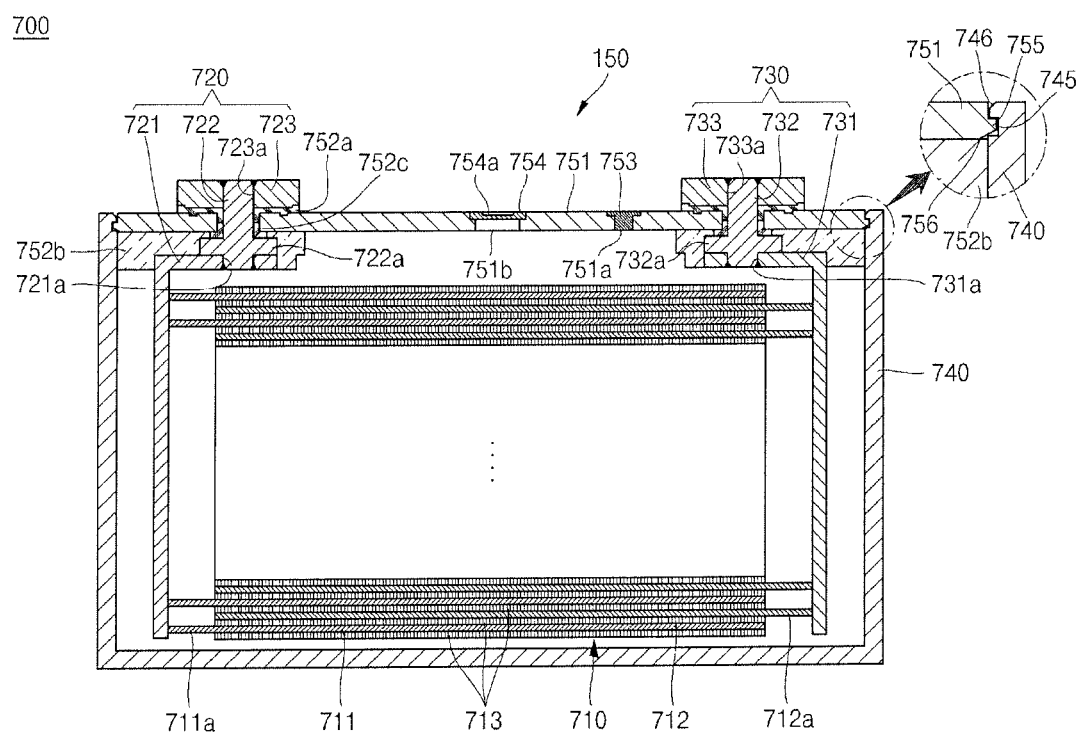
FIG. 6 is a cross-sectional view of a secondary battery according to still another embodiment of the present invention.

FIG. 6 is a cross-sectional view of a secondary battery according to still another embodiment of the present invention.

Referring to FIG. 6, the secondary battery 700 according to still another embodiment of the present invention includes an electrode assembly 710, a first terminal 720, a second terminal 730, a case 740 and a cap assembly 750.

The electrode assembly 710 is formed by winding or laminating a stack of a first electrode plate 711, a separator 713, and a second electrode plate 712, which are thin plates or layers. In this embodiment, the first electrode plate 711 may function as a negative electrode and the second electrode plate 712 may function as a positive electrode, and vice versa.

The first electrode plate 711 is formed by coating a first electrode active material, such as graphite or carbon on a first electrode collector formed of a metal foil made of copper, a copper alloy, nickel or a nickel alloy, and includes a first electrode uncoated portion 711a that is a region without a first electrode active material coated thereon. The first electrode uncoated portion 711a may become a passage of the flow of current between the first electrode plate 711 and the outside of the first electrode plate 711. Meanwhile, the present invention does not limit the material of the first electrode plate 711 to the above materials.

The second electrode plate 712 is formed by coating a second electrode active material, such as a transition metal oxide on a second electrode collector formed of a metal foil made of aluminum or an aluminum alloy, and includes a second electrode uncoated portion 712*a* that is a region without a second electrode active material coated thereon. The second electrode uncoated portion 712*a* may become a passage of the flow of current between the second electrode plate 712 and the outside of the second electrode plate 712. Meanwhile, the present invention does not limit the material of the second electrode plate 712 to the above materials.

Polarities of the first electrode tab 114 and the second electrode tab 115 may be changed to then be arranged.

The separator 713 may be positioned between the positive electrode plate 711 and the negative electrode plate 712 to prevent a short-circuit and to allow only movement of lithium ions. The separator 713 may be formed of polyethylene, polypropylene or a composite film of polyethylene and polypropylene. Meanwhile, the present invention does not limit the material of the separator 713 to the above materials.

A first terminal 720 and a second terminal 730 electrically connected to the first electrode plate 711 and the second electrode plate 712, are positioned at opposite ends of the electrode assembly 710, respectively.

The electrode assembly 710 is accommodated in the case 740 together with an electrolyte. The electrolyte may include an organic solvent such as ethylene carbonate (EC), propylene carbonate (PC), diethyl carbonate (DEC), ethylmethyl carbonate (EMC), or dimethyl carbonate (DMC), and a lithium salt such as $LiPF_6$ or $LiBF_4$. In addition, the electrolyte may be in a liquid, sold or gel phase.

The first terminal 720 is made of a metal and is electrically connected to the first electrode plate 711. The first terminal 720 includes a first collector plate 721, a first terminal pillar 722 and a first terminal plate 723.

The first collector plate 721 makes contact with a first electrode uncoated portion 711*a* protruding at one end of the electrode assembly 710. The first collector plate 721 is welded to the first electrode uncoated portion 711*a*. The first collector plate 721 is formed in a clockwise 90° rotated L ('Γ') shape and has a terminal hole 721*a* formed at its top portion. The first terminal pillar 722 is fitted into the terminal hole 721*a* to be riveted or welded. The first collector plate 721 may be made of, for example, copper or a copper alloy. However, the present invention does not limit the material of the first collector plate 721 to the above materials.

The first terminal pillar 722 upwardly protrudes and extends a predetermined length while passing through a cap plate 751 to be described later, and is electrically connected to the first collector plate 721 under the cap plate 751. The first terminal pillar 722 upwardly protrudes and extends a predetermined length from the cap plate 751, and has a flange 722*a* formed under the cap plate 751 to prevent the first terminal pillar 722 from being separated from the cap plate 751. A region of the first terminal pillar 722 positioned under the flange 722*a* is fitted into the terminal hole 721*a* of the first collector plate 721 to then be riveted or welded. Here, the first terminal pillar 722 is electrically insulated from the cap plate 751. The first terminal pillar 722 is made of aluminum or an aluminum alloy. However, the present invention does not limit the material of the first terminal pillar 722 to the above materials.

The first terminal plate 723 has a hole 723*a*. The first terminal pillar 722 is coupled and welded to the hole 723*a*. That is to say, upwardly exposed boundary regions of the first terminal pillar 722 and the first terminal plate 723 are welded to each other. For example, laser beam is applied to the upwardly exposed boundary regions of the first terminal pillar 722 and the first terminal plate 723, thereby melting and cooling the boundary regions to then be welded to each other.

As described above, the first terminal pillar 722 is made of aluminum or an aluminum alloy and the first terminal plate 723 is also made of aluminum or an aluminum alloy. Therefore, welding between the first terminal pillar 722 and the first terminal plate 723 may be easily performed and improved welding quality can be achieved. However, the present invention does not limit the materials of the first terminal pillar 722 and the first terminal plate 723 to the above materials.

In addition, a bus bar (not shown) made of aluminum or an aluminum alloy may also be easily welded to the first terminal plate 723.

The second terminal 730 is also made of a metal and is electrically connected to the second electrode plate 712. The second terminal 730 includes a second collector plate 731, a second terminal pillar 732 and a second terminal plate 733.

The second collector plate 731 makes contact with a second electrode uncoated portion 712*a* protruding at one end of the electrode assembly 710. The second collector plate 731 is formed in a counterclockwise 180° rotated L ('⌐') shape and has a terminal hole 731*a* formed at its top portion. The second terminal pillar 732 is fitted into the terminal hole 731*a* to be coupled. The second collector plate 731 may be made of, for example, aluminum or an aluminum alloy. However, the present invention does not limit the material of the second collector plate 731 to the above materials.

The second terminal pillar 732 upwardly protrudes and extends a predetermined length while passing through the cap plate 751 to be described later, and is electrically connected to the second collector plate 731 under the cap plate 751. The second terminal pillar 732 upwardly protrudes and extends a predetermined length from the cap plate 751, and has a flange 732*a* formed under the cap plate 751 to prevent the second terminal pillar 732 from being separated from the cap plate 751. A region of the second terminal pillar 732 positioned under the flange 732*a* is fitted into the terminal hole 731*a* of the second collector plate 731 to then be riveted or welded. Here, the second terminal pillar 732 is electrically insulated from the cap plate 751. The second terminal pillar 732 is made of aluminum or an aluminum alloy. However, the present invention does not limit the material of the second terminal pillar 732 to the above materials.

The second terminal plate 733 has a hole 733*a*. The second terminal pillar 732 is coupled and welded to the hole 733*a*. That is to say, upwardly exposed boundary regions of the second terminal pillar 732 and the second terminal plate 733 are welded to each other. For example, laser beam is applied to the upwardly exposed boundary regions of the second terminal pillar 732 and the second terminal plate 733, thereby melting and cooling the boundary regions to then be welded to each other.

As described above, the second terminal pillar 732 is made of aluminum or an aluminum alloy and the second terminal plate 733 is also made of aluminum or an aluminum alloy. Therefore, welding between the second terminal pillar 732 and the second terminal plate 733 may be easily performed and improved welding quality can be achieved. However, the present invention does not limit the materials of the second terminal pillar 732 and the second terminal plate 733 to the above materials.

In addition, a bus bar (not shown) made of aluminum or an aluminum alloy may also be easily welded to the second terminal plate 733. The second terminal plate 733 may be electrically connected to the cap plate 751. Therefore, the cap plate 751 and the case 740, which will later be described, may have the same polarity as the second terminal 730 (e.g., a positive polarity).

Here, a winding axis of the electrode assembly 710 (i.e., a left-and-right horizontal axis of FIG. 6) is substantially parallel or horizontal to a terminal axis of the first terminal pillar 722 of the first terminal 720 (i.e., an up-and-down vertical axis of FIG. 6) or a terminal axis of the second terminal pillar 732 of the second terminal 730 (i.e., an up-and-down vertical axis of FIG. 6).

The case 740 is made of a conductive metal such as aluminum, an aluminum alloy or nickel plated steel, and may have an approximately hexahedral shape with an opening so that the electrode assembly 710, the first terminal 720 and the second terminal 730 can be inserted and placed in the case 740. That is to say, the case 740 includes two pairs of side portions spaced a predetermined distance apart from each other and a bottom portion formed perpendicular to the side portions. Meanwhile, since the case 740 and the cap assembly 750 assembled with each other are illustrated in FIG. 6, an opening is not illustrated. However, the opening may substantially correspond to an open edge of the cap assembly 750. In addition, since an inner surface of the case 740 is insulated, the case 740 may be electrically insulated from the electrode assembly 710, the first terminal 720, the second terminal 730 and the cap assembly 750.

A coupling groove 745 that is recessed a predetermined depth is formed at a region adjacent to the opening of at least one of the two pairs of side portions of the case 740. The coupling groove 745 is engaged with a coupling protrusion 755 of the cap plate 751 to be described later, thereby increasing coupling force between the case 740 and the cap plate 751 and preventing the cap plate 751 from moving. In addition, an inclined portion 746 may be formed on the coupling groove 745 of the case 740 to allow the coupling protrusion 755 to be easily engaged with the coupling groove 745 of the case 740. In some cases, the coupling groove 745 of the case 740 may be formed to have various shapes as shown in FIGS. 5A to 5B and be placed in the various locations of FIGS. 4A-4D.

The cap assembly 750 is coupled to the case 740. The cap assembly 750 includes the cap plate 751, a seal gasket 752c, a plug 753, a safety vent 754, an upper insulation member 752a and a lower insulation member 752b.

The cap plate 751 seals the opening of the case 740 and may be made of the same material as the case 740. For example, the cap plate 751 may be coupled to the case 740 by laser welding. As described above, since the cap plate 751 has the same polarity with the second terminal 730, the cap plate 751 and the case 740 may have the same polarity.

The coupling protrusion 755 is formed on a side surface of the cap plate 751 making contact with the inner surface of the case 740. At least two coupling protrusions 755 may be formed to be symmetrical with each other. When the case 740 is combined with the cap plate 751, the coupling protrusion 755 is placed in the coupling groove 745 formed in a region of the inner surface of the case 740 corresponding to the coupling protrusion 755.

In particular, the coupling protrusion 755 is formed to be spaced apart from top and bottom surfaces of the cap plate 751. In addition, an inclined surface 756 is formed on a region extending from a lower portion of the coupling protrusion 755 to a bottom surface of the cap plate 751. Therefore, the coupling protrusion 755 of the cap plate 751 may be easily placed in the coupling groove 745 by the inclined surface 756 and the inclined portion 746. Once the coupling protrusion 755 and the coupling groove 745 are engaged with each other, exposed boundary regions of the cap plate 751 and the case 740 are welded to each other. For example, laser beam is applied to the upwardly exposed boundary regions of the cap plate 751 and the case 740, thereby melting and cooling the boundary regions to then be welded to each other.

Meanwhile, the cap plate 751 has two pairs of side surfaces facing each other. Here, positions of the coupling protrusions 755 may be determined by one selected from the positions exemplified in FIGS. 4A to 4D. That is to say, each one of the coupling protrusions 755 may be formed on the center of one selected from the two pairs of side surfaces, on each of centers of all of the two pairs of side surfaces, or on each of corners at which the two pairs of side surfaces are connected to each other. Here, it is quite natural to form the coupling groove 745 at a region inside of the case 740, corresponding to the coupling protrusion 755.

The seal gasket 752c is made of an insulating material and is formed between each of the first terminal pillar 722 and the second terminal pillar 732 and the cap plate 751 to seal portions between each of the first terminal pillar 722 and the second terminal pillar 732 and the cap plate 751. The seal gasket 752c may prevent external moisture from permeating into the secondary battery 700 or may prevent an electrolyte contained in the secondary battery 700 from flowing out.

The plug 753 seals an electrolyte injection hole 751a of the cap plate 751. The safety vent 754 is installed in a vent hole 751b of the cap plate 751 and has a notch 754a configured to be opened at a predefined pressure.

The upper insulation member 752a is formed between each of the first terminal pillar 722 and the second terminal pillar 732 and the cap plate 751. In addition, the upper insulation member 752a makes close contact with the cap plate 751. Further, the upper insulation member 752a may also make close contact with the seal gasket 752c. The upper insulation member 752a electrically insulates the first terminal pillar 722 and the second terminal pillar 732 from the cap plate 751.

The lower insulation member 752b is formed between each of the first collector plate 721 and the second collector plate 731 and the cap plate 751 and prevents unnecessary short circuits therebetween. That is to say, the lower insulation member 752b prevents short circuits between the first collector plate 721 and the cap plate 751 and between the second collector plate 731 and the cap plate 751.

Figure 7:
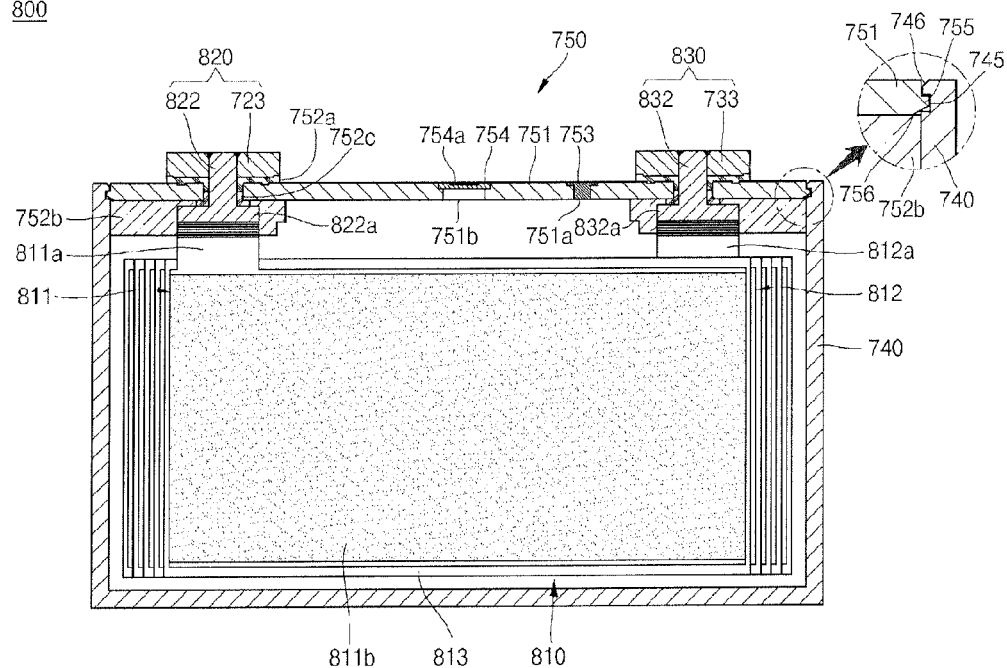
FIG. 7 is a cross-sectional view of a secondary battery according to still another embodiment of the present invention.

FIG. 7 is a cross-sectional view of a secondary battery according to still another embodiment of the present invention.

Referring FIG. 7, the secondary battery 800 according to still another embodiment of the present invention includes an electrode assembly 810, a first terminal 820, a second terminal 830, a case 740 and a cap assembly 750. The case 740 and the cap assembly 750 are the same as described in FIG. 6 and incorporate the protrusion 745, the groove 755 and the inclined surfaces 746, 756 substantially as described above. Here, since the electrode assembly 810, the first terminal 820 and the second terminal 830 have substantially the same configurations as the electrode assembly 710, the first terminal 720 and the second terminal 720 of the secondary battery 700 and repeated descriptions thereof will be reduced. The secondary battery 800 is different from the secondary battery 700 shown in FIG. 6 in view of a connection mechanism between the electrode assembly 810 and each of the first and second terminals 820 and 830. Therefore, the following description will focus on the connection mechanism between the electrode assembly 810 and each of the first and second terminals 820 and 830.

The electrode assembly 810 is formed by winding or laminating a stack of a first electrode plate 811, a separator 813, and a second electrode plate 712 (812), which are thin plates or layers. In addition, the first terminal 820 is electrically connected to the first electrode plate 811 and includes a first terminal pillar 822 and a first terminal plate 723. The second terminal 830 is electrically connected to the second electrode plate 712 (812) and includes a first terminal pillar 832 and a first terminal plate 733.

A winding axis of the electrode assembly 810 is substantially parallel or horizontal to a terminal axis of the first terminal pillar 822 of the first terminal 820 or a terminal axis of the second terminal pillar 832 of the second terminal 830. Here, the winding axis and the terminal axis may mean axes formed in an up-and-down direction in FIG. 7, and the expression "the winding axis and the terminal axis being substantially parallel or horizontal to each other" may mean that the winding axis and the terminal axis may not meet each other even if the winding axis and the terminal axis are extended or may meet each other when the winding axis and the terminal axis are extraordinarily extended.

In addition, a first electrode tab 811a is interposed between the electrode assembly 810 and the first terminal pillar 822 of the first terminal 820, and a second electrode tab 812a is interposed between the electrode assembly 810 and the second terminal pillar 832 of the second terminal 830. That is to say, the first electrode tab 811a extends from a top end of the electrode assembly 810 to a bottom end of the first terminal pillar 822 of the first terminal 820 to then be electrically connected to or welded to a planar flange 822a provided in the first terminal pillar 822. In addition, the second electrode tab 812a extends from the top end of the electrode assembly 810 to a bottom end of the second terminal pillar 832 of the second terminal 830 to then be electrically connected to or welded to a planar flange 832a provided in the second terminal pillar 832.

Substantially, the first electrode tab 811a may be a first uncoated portion itself, which is a region of the first electrode plate 811 of the electrode assembly 810, without a first active material 811b coated thereon, or may be a separate member connected to a first uncoated portion. Here, the first uncoated portion may be made of the same material as the first electrode plate 711, and the separate member may be made of one selected from the group consisting of nickel, a nickel alloy, copper, a copper alloy, aluminum, an aluminum alloy, and equivalents thereto.

In addition, the second electrode tab 812a may be a second uncoated portion itself, which is a region of the second electrode plate 712(812) of the electrode assembly 810, without a second active material (not shown) coated thereon, or may be a separate member connected to a second uncoated portion. Here, the second uncoated portion may be made of the same material as the second electrode plate 712(812), and the separate member may be made of one selected from the group consisting of aluminum, an aluminum alloy, nickel, a nickel alloy, copper, a copper alloy, and equivalents thereto.

As described above, since a winding axis of the electrode assembly 810 and a terminal axis of each of the first and second terminals 820 and 830 are formed to be substantially parallel or horizontal to each other, the electrode assembly exhibits high electrolyte impregnation capability when an electrolyte is injected and internal gases are rapidly transferred to a safety vent during over-charge, enabling the safety vent to quickly operate.

In addition, electrode tabs 811a and 812a (or uncoated portions or separate members) of the electrode assembly 810 are directly electrically connected to electrode terminals, which shortens electrical paths, thereby reducing internal resistance of the secondary battery while reducing the number of components of the secondary battery.

As described above, according to the present invention, since electrode tabs provided in an electrode assembly are directly electrically connected to electrode terminals, the electrode assembly and the electrode terminals can be electrically connected to each other in a simplified manner and the number of components can also be reduced.

Although secondary batteries according to example embodiments of the present invention have been described in detail hereinabove, it should be understood that many variations and modifications of the basic inventive concept herein described, which may appear to those skilled in the art, fall within the spirit and scope of the present invention as defined by the appended claims and their equivalents.

What is claimed is:

1. A secondary battery comprising:
an electrode assembly;
a case accommodating the electrode assembly; and
a cap plate coupled to an opening of the case,
wherein a coupling protrusion protruding toward an inner surface of the case is formed on a side surface of the cap plate, and a coupling groove corresponding to the coupling protrusion is formed on the inner surface of the case wherein the coupling groove is formed such that a portion of the groove extends toward the side surface of the cap plate such that the portion is interposed between the coupling protrusion and an upper surface of the case.

2. The secondary battery of claim 1, wherein at least two coupling protrusions are formed to be symmetrical with each other.

3. The secondary battery of claim 2, wherein the cap plate has two pairs of side surfaces facing each other and each one of the coupling protrusions is provided on one selected from the two pairs of side surfaces.

4. The secondary battery of claim 2, wherein the cap plate has two pairs of side surfaces facing each other, and each one of the coupling protrusion is provided on each one of the two pairs of side surfaces.

5. The secondary battery of claim 2, wherein the cap plate has two pairs of side surfaces facing each other, and each one of the coupling protrusion is provided on each of corners at which the two pairs of side surfaces are connected to each other.

6. The secondary battery of claim 1, wherein the cap plate has a top surface, a bottom surface facing the top surface, and side surfaces connecting the top surface and the bottom surface to each other, the coupling protrusion is formed on the side surface of the cap plate, and an inclined surface is formed on a region extending from a lower portion of the coupling protrusion to a bottom surface of the cap plate.

7. The secondary battery of claim 1, wherein the coupling groove is a groove which is recessed to a predetermined depth from the inner surface of the case to an outer surface of the case.

8. The secondary battery of claim 7, wherein a protrusion, which protrudes as much as the depth of the coupling groove, is formed on a region of the outer surface of the case, the region corresponding to the coupling groove.

9. The secondary battery of claim 1, wherein the case comprises:
  first and second grooves which are spaced apart from each other and are recessed a predetermined depth from the outer surface of the case to the inner surface of the case; and
  first and second protrusions which protrude on regions corresponding to the first and second grooves as much as the depth of each of the first and second grooves, and
  wherein a coupling groove is formed between the first and second protrusions.

10. The secondary battery of claim 1, wherein an inclined surface is formed on an upper region, corresponding to the coupling groove inside the opening of the case.

11. A secondary battery comprising:
  an electrode assembly;
  a case that receives the electrode assembly wherein the case defines an opening with inner sidewalls;
  a cap plate coupled to the side walls of the opening of the case; and
  at least one coupling protrusion and at least one coupling groove being formed on the cap plate and the inner side walls of the case that engage with each other to retain the cap plate on the case wherein the at least one coupling groove is formed such that both the upper and lower surface of the coupling protrusion are positioned inside the groove adjacent an inner wall of the groove and such that the inner wall of the groove is interposed between the outside of the case and the coupling protrusion.

12. The secondary battery of claim 11, wherein the at least one coupling protrusion is formed on the cap plate and the at least one coupling groove is formed on the inner side wall of the case.

13. The secondary battery of claim 12, wherein the cap plate has two pairs of side surfaces facing each other and each one of the coupling protrusions is provided on one selected from the two pairs of side surfaces.

14. The secondary battery of claim 12, wherein the cap plate has two pairs of side surfaces facing each other, and each one of the coupling protrusion is provided on each one of the two pairs of side surfaces.

15. The secondary battery of claim 12, wherein the cap plate has two pairs of side surfaces facing each other, and each one of the coupling protrusion is provided on each of corners at which the two pairs of side surfaces are connected to each other.

16. The secondary battery of claim 11, wherein the at least one protrusion and the at least one groove have planar surfaces.

17. The secondary battery of claim 11, wherein the at least one protrusion and the at least one groove have rounded surfaces.

18. The secondary battery of claim 11, wherein the cap plate has a top surface, a bottom surface facing the top surface, and side surfaces connecting the top surface and the bottom surface to each other, the at least one coupling protrusion is formed on the side surface of the cap plate, and an inclined surface is formed on a region extending from a lower portion of the at least one coupling protrusion to a bottom surface of the cap plate.

19. The secondary battery of claim 11, wherein the case comprises:
  first and second grooves which are spaced apart from each other and are recessed a predetermined depth from the outer surface of the case to the inner surface of the case; and
  first and second protrusions which protrude on regions corresponding to the first and second grooves as much as the depth of each of the first and second grooves, and
  wherein a coupling groove is formed between the first and second protrusions.

20. The secondary battery of claim 11, wherein an inclined surface is formed on an upper region, corresponding to the coupling groove inside the opening of the case.

* * * * *